United States Patent [19]

Minami et al.

[11] Patent Number: 5,509,094
[45] Date of Patent: Apr. 16, 1996

[54] MODE SPLITTER AND A MAGNETO-OPTICAL DISK PICK-UP DEVICE HAVING THE MODE SPLITTER

[75] Inventors: Kohji Minami, Gose; Kuniaki Okada; Hiroyuki Yamamoto, both of Tenri; Yoshio Yoshida, Nara; Yukio Kurata, Tenri; Keiji Sakai, Nara, all of Japan

[73] Assignee: Sharp Kabushiki Kaisha, Osaka, Japan

[21] Appl. No.: 213,800

[22] Filed: Mar. 16, 1994

[30] Foreign Application Priority Data

Mar. 16, 1993 [JP] Japan .................................. 5-056196

[51] Int. Cl.$^6$ .................................................. G02B 6/26
[52] U.S. Cl. .............................. 385/29; 385/28; 385/43
[58] Field of Search .............................. 385/11, 14, 28, 385/29, 43; 369/44.12, 112

[56] References Cited

U.S. PATENT DOCUMENTS

| 3,617,109 | 11/1971 | Tien | 385/29 |
| 4,943,129 | 7/1990 | Takeda et al. | 385/43 |
| 5,208,800 | 5/1993 | Isobe et al. | 385/43 X |
| 5,276,745 | 1/1994 | Ravelli, Jr. | 385/14 |
| 5,323,476 | 7/1994 | Mueller et al. | 385/43 |

FOREIGN PATENT DOCUMENTS

| 64-4706 | 1/1989 | Japan . |
| 2-235225 | 9/1990 | Japan . |

*Primary Examiner*—Rodney B. Bovernick
*Assistant Examiner*—Hemang Sanghavi
*Attorney, Agent, or Firm*—Morrison & Foerster

[57] ABSTRACT

A mode splitter and the magneto-optical pick-up device including the mode splitter are provided. The mode splitter includes a tapered waveguide portion whose thickness gradually becomes thin so that a light of at least one mode can be cut off. An emission position of a light wave can be varied depending on its mode. In this mode splitter, the emission position of the light wave of each mode can be adjusted by changing a thickness of the tapered waveguide, thereby improving the degree of freedom in designing the device.

9 Claims, 12 Drawing Sheets

MODE SPLITTER AND A MAGNETO-OPTICAL DISK PICK-UP DEVICE HAVING THE MODE SPLITTER

BACKGROUND OF THE INVENTION

1. Field of the Invention

The present invention relates to a mode splitter (mode separation device) and a magneto-optical disk pick-up device using the mode splitter.

2. Description of the Related Art

As a mode separation device using a flat-plate optical waveguide, a mode splitter of a 90° Bragg type, a directional coupling type or the like has conventionally been known.

However, a mode splitter of the 90° Bragg type has a disadvantage of being weak against a wavelength shift. Further, the mode splitter of a directional coupling type requires strict regulation and control of a coupling length and the like during the fabrication thereof, so that there are also disadvantages of poor productivity and raising a cost.

Because of the above-mentioned disadvantages, an optical integrated device, such as an optical pick-up device including a mode splitter is difficult to be put to a practical use.

Figure 12:
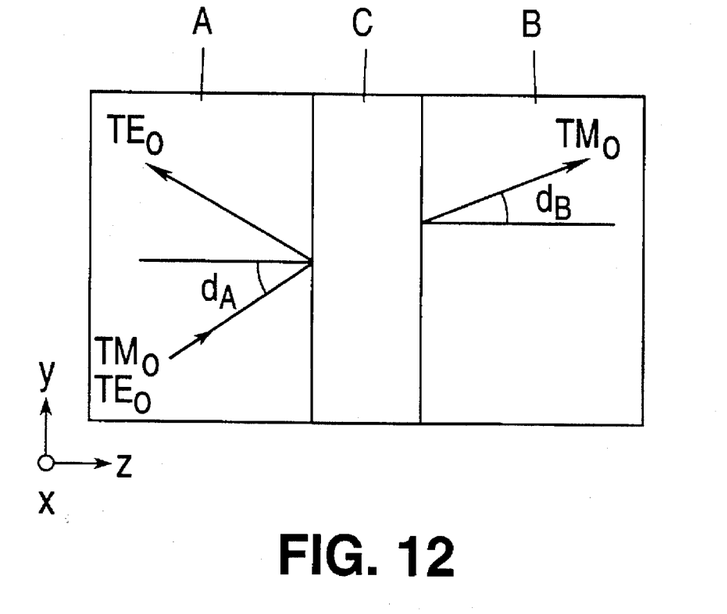
FIG. 12 is a plan view showing a conventional mode splitter.
Figure 13:
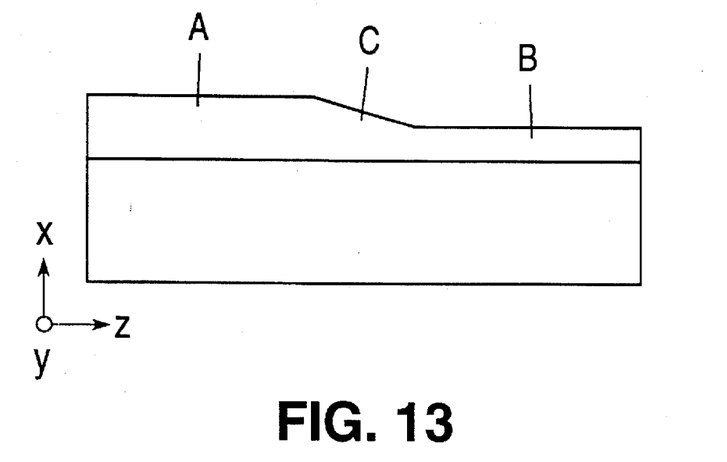
FIG. 13 is a side view of the mode splitter of FIG. 12.

In view of such problems, in recent years, a mode splitter using a flat-plate optical waveguide has been improved so as to be applicable to the optical integrated device. An example of such a mode splitter is shown in FIGS. 12 and 13. This mode splitter has two flat-plate waveguides A and B each having a uniform thickness. The waveguides A and B are combined with each other through a coupler C. The thickness of the coupler is varied to form a tapered shape in a cross section. In this mode splitter, propagation constants $\beta_{iA}$, $\beta_{iB}$, $\beta_{jA}$, and $\beta_{jB}$ and an incident angle $\alpha_A$ are set in order to satisfy the relationships: $\beta_{iA} > \beta_{iB}$, $\beta_{jA} > \beta_{jB}$ and $\alpha_A < \arcsin(\beta_{iB}/\beta_{iA})$, $\alpha_A > \arcsin(\beta_{jB}/\beta_{jA})$, while at least the light wave of i mode and the light wave of j mode are propagated in the same direction.

As a result, in the case where, for example, the modes i and j are respectively represented as a $TE_O$ mode and a $TM_O$ mode, the $TE_O$ mode (a TE wave) is completely reflected on the tapered coupler C and the $TM_O$ mode (a TM wave) is transmitted from the waveguide A to the waveguide B. Accordingly, the TE wave and the TM wave can be separated from each other (i.e., a deflection separation).

However, there are problems in the above-mentioned mode splitter.

That is, while performing a mode separation in the mode splitter shown in FIGS. 12 and 13, a separated light wave remains to be confined in a waveguide layer. Accordingly, it is required to provide a grating type coupler or the like in an optical integrated device including such a mode splitter for emitting a light wave from a waveguide layer in order that the light wave confined in the waveguide layer (i.e., light wave) is carried to a detection system.

Thus, the optical integrated device including the above-mentioned mode splitter has disadvantages that its structure becomes complicated and larger-sized. Moreover, while emitting the light wave from the waveguide layer by the grating coupler or the like, the coupling is damaged due to the wavelength shift or the like.

Furthermore, the light wave is diagonally incident on the tapered coupler C (see FIG. 12), and the TE wave and the TM wave are separated (deflection separation). A slight shift in an incidental angle makes a larger reflection of the TM wave from the tapered coupler C, namely, the slight shift is a great factor for changing the reflectance of the TM wave. As a result, the extinction ratio (strength of the reflection light wave/strength of the transmittance light wave) is deteriorated.

SUMMARY OF THE INVENTION

A mode splitter according to the present invention comprises: a waveguide layer including a uniform waveguide section having a substantially uniform thickness and a tapered waveguide section which is optically coupled with the uniform waveguide section, wherein the uniform waveguide section propagates a plurality of light waves of different modes, and the tapered waveguide section has a thickness gradually thinned so that the light waves are cut off in the tapered waveguide section, thereby emitting the light waves from different positions of the tapered waveguide section.

In one embodiment of the invention, the mode splitter comprises a first layer coupled with the waveguide layer, and a second layer coupled with the first layer, the second layer including at least one refracting region for refracting a corresponding one of the light waves emitted from the tapered waveguide.

In one embodiment of the invention, the refracting region has a lower refractive index than that of the second layer.

In one embodiment of the invention, the mode splitter comprises a substrate for supporting the first and second layers and the waveguide layer, the substrate having a higher refractive index than that of the refracting region of the second layer.

In one embodiment of the invention, the tapered waveguide section of the waveguide layer includes a plurality of tapered portions.

A magneto-optical disk pick-up device according to the present invention comprises: a light source for emitting light; a first optical means for focusing the light on a magneto-optical recording medium; a second optical means for guiding the light reflected from the magneto-optical recording medium to a servo signal generation means for producing servo signals in response to the light reflected from the magneto-optical recording medium; and a mode splitter for receiving the light from the second optical means and splitting the light into a plurality of light waves of different modes, and guiding the plurality of light waves to a magneto-optical information reproduction means, the mode splitter comprising: a waveguide layer including an uniform waveguide section having a substantially uniform thickness and a tapered waveguide section which is optically coupled with the uniform waveguide section, wherein the uniform waveguide section propagates the light from the second optical system, and the tapered waveguide section has a thickness gradually thinned so that the light waves are cut off in the tapered waveguide section, thereby emitting the light waves from different positions of the tapered waveguide section.

In one embodiment of the invention, the magneto-optical pick-up device comprises: a first layer coupled with the waveguide layer; and a second layer coupled with the first layer, the second layer including at least one refracting region for refracting corresponding one of the light waves emitted from the tapered waveguide.

In one embodiment of the invention, the refracting region has a lower refractive index than that of the second layer.

In one embodiment of the invention, the magneto-optical pick-up device comprises a substrate for supporting the first and second layers and the waveguide layer, the substrate having a higher refractive index than that of the refracting region of the second layer.

In one embodiment of the invention, the tapered waveguide section of the waveguide layer includes a plurality of tapered portions.

In a flat-shaped optical waveguide in which light waves of an i mode and j mode each having a different propagation constant $\beta(\beta_i \neq \beta_j)$ can be propagated, a waveguide section having a uniform thickness is coupled to a tapered waveguide portion whose thickness gradually becomes thin in a tapered shape so that a light wave of at least one mode can be cut off. As a result, an emission position of the light wave can be varied depending on the mode. That is, mode separation can be performed. In such a mode splitter, the emission position of a light wave of each mode can be varied by changing the thickness of the tapered waveguide portion.

Moreover, a light wave can be emitted by using emission from the tapered waveguide portion in the waveguide, so that a means for emitting the light wave such as a grating coupler is not required, different from the conventional mode splitter including the tapered coupler C. Accordingly, the structure of the device can be made compact and the emission of a light wave by the coupler is not influenced due to any wavelength shift or the like.

Further, in the case of using the mode splitter of the present invention as a polarization separation device, it is not required that a light wave is diagonally incident on the tapered waveguide, which is different from the conventional mode splitter. Thus, deterioration of the extinction ratio caused by a slight change in the incident angle can thoroughly be prevented.

According to the magneto-optical disk pick-up device of the present invention, the servo signal generation system such as a photo diode and the magneto-optical information reproduction system can be integratedly mounted with the mode splitter. Accordingly, the magneto-optical disk pick-up device can be made compact.

Thus, the invention described herein makes possible advantages of (1) providing a mode splitter of an optical waveguide type in which light waves of at least two modes each having a different propagation constant, propagating in the optical waveguide in the same direction can be separated without being influenced by a wavelength shift and light wave confined in a waveguide layer can be emitted from the waveguide layer without using a coupler and (2) providing a magneto-optical disk pick-up device in which the structure of the device can be made compact by providing the mode splitter therein.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
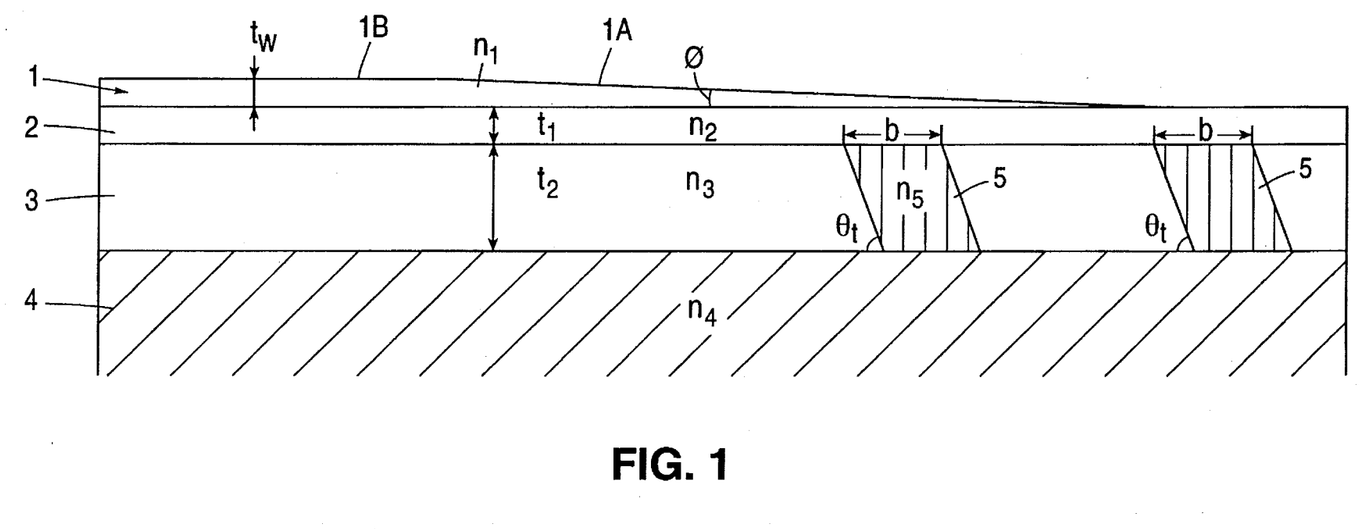
FIG. 1 is a cross-sectional view of a first example of a mode splitter according to the present invention.
Figure 2:
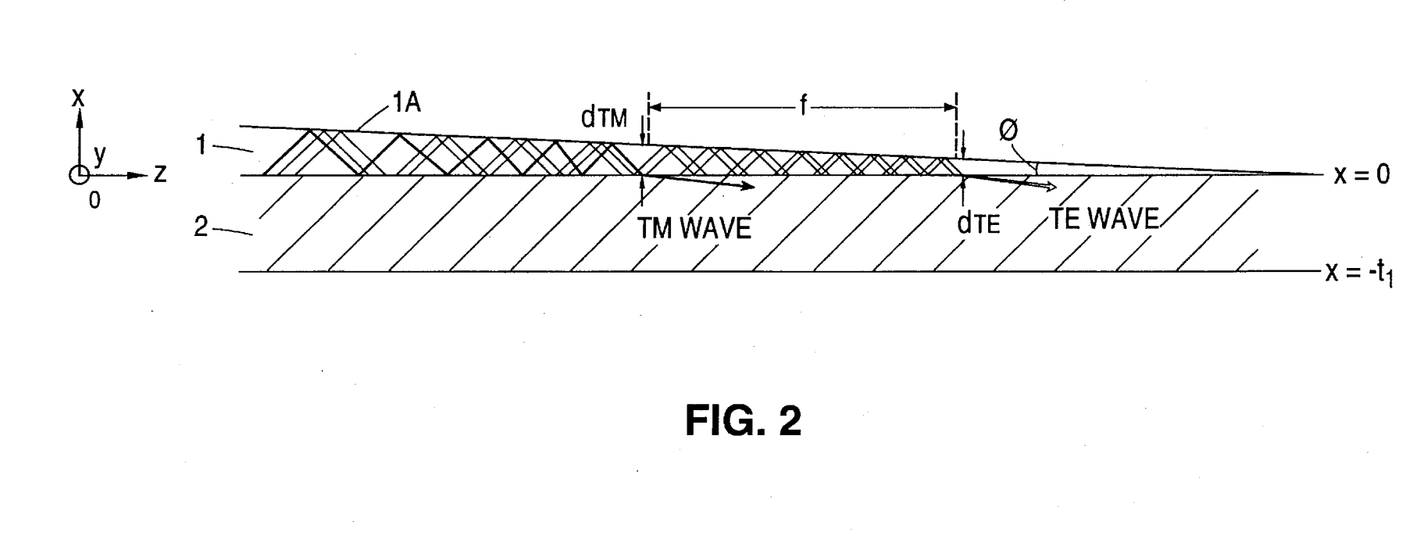
FIG. 2 is a cross-sectional view showing the way of emission of a TE wave and a TM wave.
Figure 3:
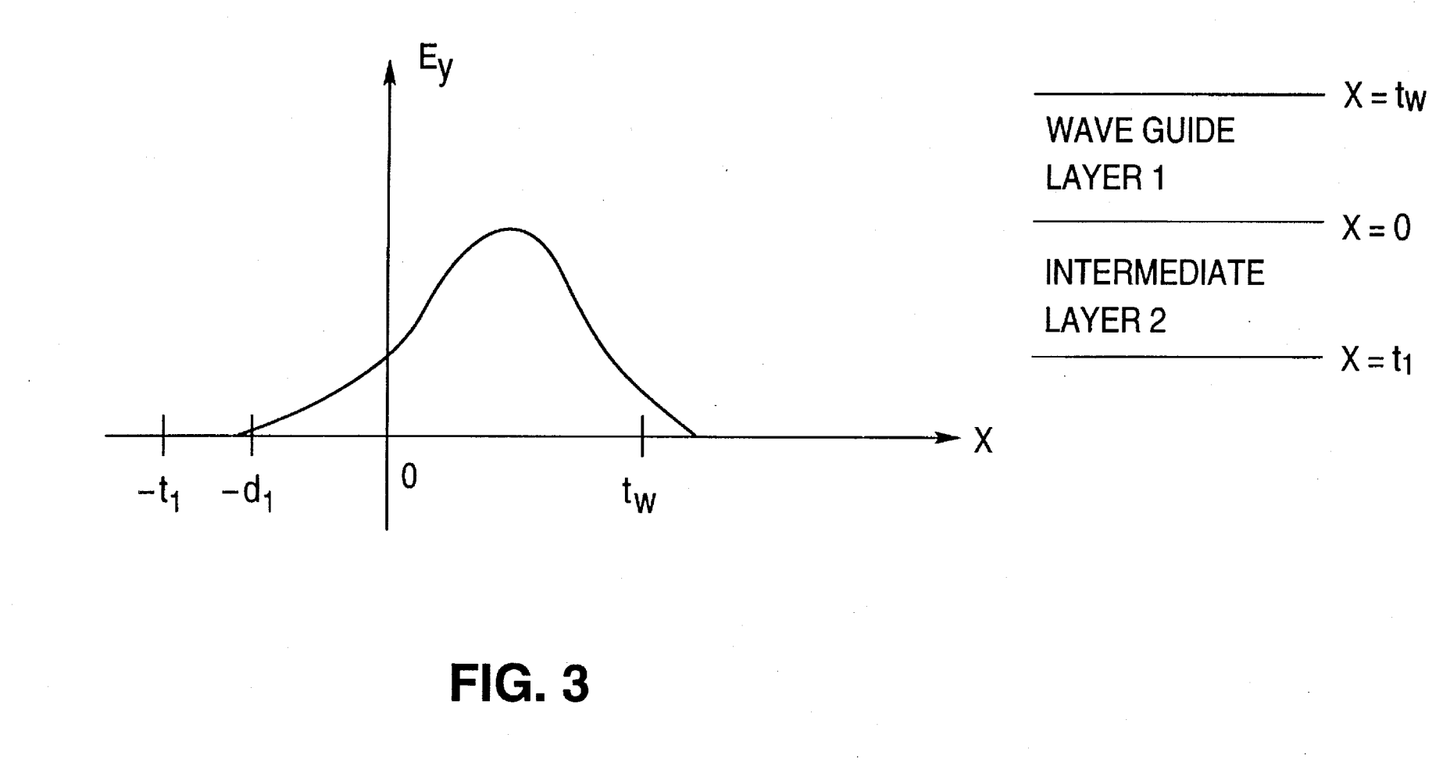
FIG. 3 is graph showing distribution of the strength of a y component of electric fields of the TE wave depending on x position.

FIGS. 1 through 3 show a first example of a mode splitter-according to the present invention. This example is a mode splitter which is applied to a polarized light separation device for separating a light wave of a $TE_O$ mode and a light wave of a $TM_O$ mode. Here, the light wave of the $TE_O$ mode (propagation constant: $\beta_{TE}$) and a light wave of a $TM_O$ mode (propagation constant: $\beta_{TM}$) are propagated through a waveguide in the mode splitter. The structure of mode splitter will be now described in detail.

The mode splitter has a flat-plate substrate 4, on which a second intermediate layer 3, a first intermediate layer 2 and a waveguide layer 1 are formed in this order. The substrate 4 is made of a material with a refractive index of $n_4$. The second intermediate layer 3 of a flat plate shape is made of a material having a refractive index of $n_3$ and a uniform thickness of $t_2$. The second intermediate layer 3 includes two refractive regions 5 of a parallelogram shape formed therein with an appropriate distance therebetween. Each refractive region 5 is made of a material having a refractive index of $n_5$ and a width of b, inclined at $\theta_t$ with respect to the second intermediate layer 3. The first intermediate layer 2 of a flat plate shape is made of a material having a refractive index of $n_2$ and an uniform thickness of $t_1$. The waveguide layer 1 made of a material having a refractive index of $n_1$ includes a tapered portions 1A. having a gradient angle $\phi$.

The tapered portion 1A is positioned above both of the two refractive regions 5 and coupled to a uniform waveguide portion 1B having an uniform thickness of $t_W$. A light wave which is incident on the waveguide layer 1 propagates through the uniform waveguide portion 1B into the tapered portion 1A, where the light wave is split into different polarized light waves in accordance with the modes thereof.

In this example, the thickness of $t_W$ of the uniform waveguide portion 1B is set so that only the light wave of the $TE_O$ mode and that of the $TM_O$ mode can be propagated.

The second intermediate layer 3 is provided so as to refract a light wave which is incident thereon toward a desired direction. For the sake of preferable refraction, the refractive indexes $n_5$, $n_4$ and $n_3$ have the following relationship represented by the Relationship (1).

$$n_5 < n_3,\ n_5 < n_4 \quad (1)$$

The substrate 4 having the refractive index $n_4$ serves to increase the refractive effect of the refractive regions 5.

The principle of the mode separation in the mode splitter will be now described with reference to FIG. 2. In general, as the thickness of a waveguide layer where light wave is mainly propagated is decreased, the degree of the light wave confinement within the waveguide layer is decreased. If the thickness of the waveguide is decreased to be less than a certain thickness, the light wave can not propagate at all in the waveguide and be emitted therefrom. This phenomenon is called as a cut-off phenomenon. In FIG. 2, three-dimensional orthogonal coordinate axes (x, y, z) are shown, in which the x direction indicates the thickness direction of the waveguide layer 1; the y direction indicates the width direction of the waveguide; and the z direction indicates the propagation direction of light waves in the waveguide layer 1.

In the case where the light waves of the $TE_O$ mode and the $TM_O$ mode propagate in the waveguide, and the propagation constant of the $TE_O$ mode ($\beta_{TE}$) and that of the $TM_O$ mode ($\beta_{TM}$) satisfy a relationship of $\beta_{TE} > \beta_{TM}$, a layer thickness $d_{TE}$ and $d_{TM}$ of the tapered portion 1A at which the light wave of each mode is cut off are different ($d_{TE} < d_{TM}$). In this mode splitter, the thickness of the waveguide layer 1 gradually becomes thin along the propagation direction of the light wave in the waveguide layer 1. As a result, when the thickness of the waveguide layer 1 is in the vicinity of $d_{TM}$, the TM wave is first emitted to the first intermediate layer 2. After that, only the TE wave can propagate in the waveguide layer 1. The thickness of the tapered portion 1A is further thinned and the TE wave is also emitted to the first intermediate layer 2 when the thickness is in the vicinity of $d_{TE}$.

As is apparent from the above, in the above-mentioned mode splitter, the TM wave and the TE wave are emitted at different positions of the waveguide layer 1, so that the mode separation (polarized light separation) can be realized. A distance f between the emission positions of the both waves is represented by using the gradient angle φ of the tapered portion 1A (FIG. 2) as in the following.

$$f = (d_{TM} - d_{TE})\tan\phi \quad (2)$$

In the mode splitter, the emission position of each mode wave can be controlled as desired by appropriately adjusting the gradient angle φ of the tapered portion 1A.

Next, a preferable condition for the first intermediate layer 2 and a function of the second intermediate layer 3 will be explained by illustrating the emission of the TM wave.

Firstly, a preferable condition for the thickness $t_1$ of the first intermediate layer 2 will be explained with reference to FIG. 3. FIG. 3 shows a distribution of the y directional component $E_y$ in electric fields of the TE wave depending on the x position along the thickness direction of the waveguide.

As is understood from FIG. 3, the $E_y$ directional component leaks toward the substrate 4 by a distance $d_1$. In order to avoid any influence caused by the leakage (i.e., in order to prevent light wave propagated through the waveguide layer 1 from being influenced by the refractive regions 5 provided in the second intermediate layer 3), the thickness $t_1$ of the first intermediate layer 2 should be set at $t_1 > d_1$.

Figure 4:
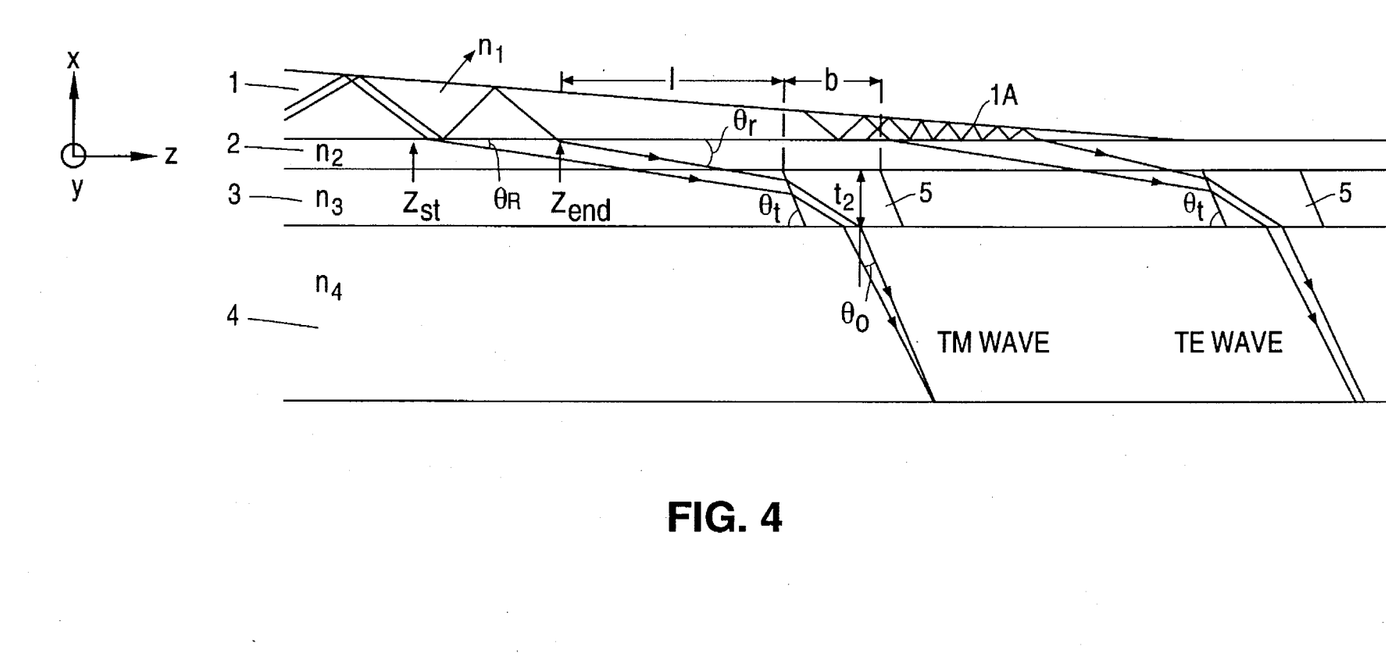
FIG. 4 is a cross-sectional view of an intermediate layer in the mode splitter of the present invention.

The provision of the second intermediate layer 3 is useful for the following reasons. An emission angle $\theta_r$ of the TM wave emitted from the waveguide layer 1 (i.e., an angle formed by a bottom surface of the waveguide layer 1 and the emission direction of the TM wave) is quite small as shown in FIG. 4. Accordingly, a degree of freedom in a direction in which light wave is emitted from the mode splitter is small, resulting in poor efficiency in emission of the light wave from the device. However, by providing the second intermediate layer 3 having the refractive regions 5, the TM wave emitted from the first intermediate layer 2 is refracted on a boundary between the second intermediate layer 3 and the refractive region 5 and the refracted light wave is further refracted on a boundary between the second intermediate layer 3 and the substrate 4 (double refraction), whereby the light wave can be emitted from the mode splitter with a preferable emission angle $\theta_O$. In this case, the degree of freedom in the emission direction of light wave can be improved, resulting in the emission of light waves from the mode splitter with satisfactory efficiency.

Figure 5:
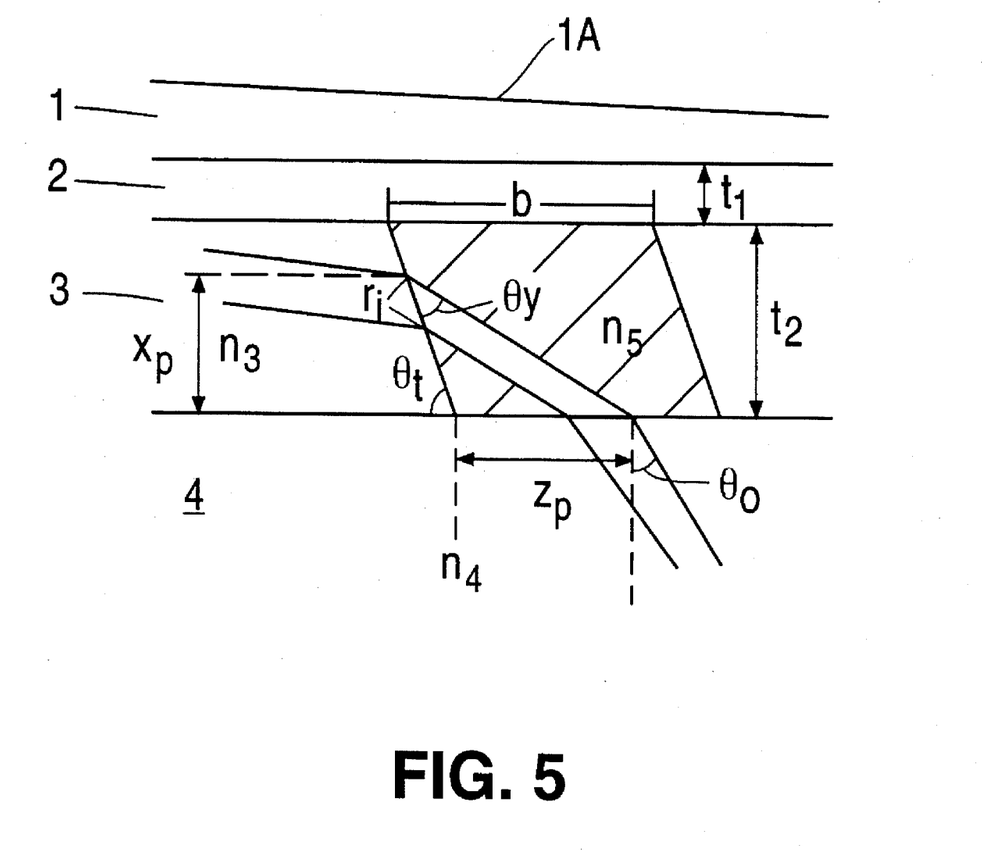
FIG. 5 is a partial cross-sectional view of a refractive region of the mode splitter according to the present invention.

Preferable conditions for parameters regarding a configuration of the second intermediate layer 3 will be explained with reference to FIGS. 4 and 5. The parameters include the thickness $t_2$ of the second intermediate layer 3, a gradient angle $\theta_t$ and a width of b of the refractive region 5, and a distance 1 between the refractive region 5 and an emission ending position $z_{end}$.

The light wave emitted from the waveguide layer 1 should propagate toward a negative x direction (the substrate 4) by at least the thickness $t_1$ of the first intermediate layer 2. Accordingly, the distance 1 should be set to satisfy the relationship of $1 > t_1 / \sin\theta_r$.

Moreover, the gradient angle $\theta_t$, a desired emission angle $-\theta_O$ from the refractive region 5 to the substrate 4 and a refractive angle $\theta_y$ of the refractive region 5 (see FIG. 5) are set so as to satisfy the following Formulas (3) and (4):

$$\theta_O = \arcsin\{n_5 \cos(\theta_t - \theta_y)/n_4\} \quad (3)$$

$$\theta_y = \arcsin\{n_3 \cos(\theta_t - \theta_r)/n_5\} \quad (4)$$

Furthermore, a value for each thickness $t_2$ and the width b should be set so that emitted light waves can sufficiently be propagated through the refractive region 5. In the case where a desired distance from an edge of the refractive region 5 to an emission position of light wave is $z_p$ ($z_p > r_i$) as shown in FIG. 5, the thickness $t_2$ and the width b should be set to satisfy the following relationships represented by the Formulas (5) and (6):

$$t_2 > x_p,\ x_p = \tan(\theta_t - \theta_y) \cdot \tan\theta_t \cdot z_p / \{\tan\theta_t - \tan(\theta_t - \theta_y)\} \quad (5)$$

$$b > z_p \quad (6)$$

wherein $r_i$ is a beam diameter of light wave incident on the refractive region 5.

The refractive region 5 with the TE wave has the same parameters as those of the refractive region 5 with the TM wave.

As is understood from FIG. 4, an emission angle $\theta_R$ from the emission starting position $z_{ST}$ of the waveguide layer 1 is larger than the emission angle $\theta_r$ at the emission ending position $Z_{end}$, so that light wave is inevitably converged in the z direction. Accordingly, if the waveguide layer 1 has a light-converging effect in the y direction, the emitted light wave can be converged.

EXAMPLE 2

Figure 6:
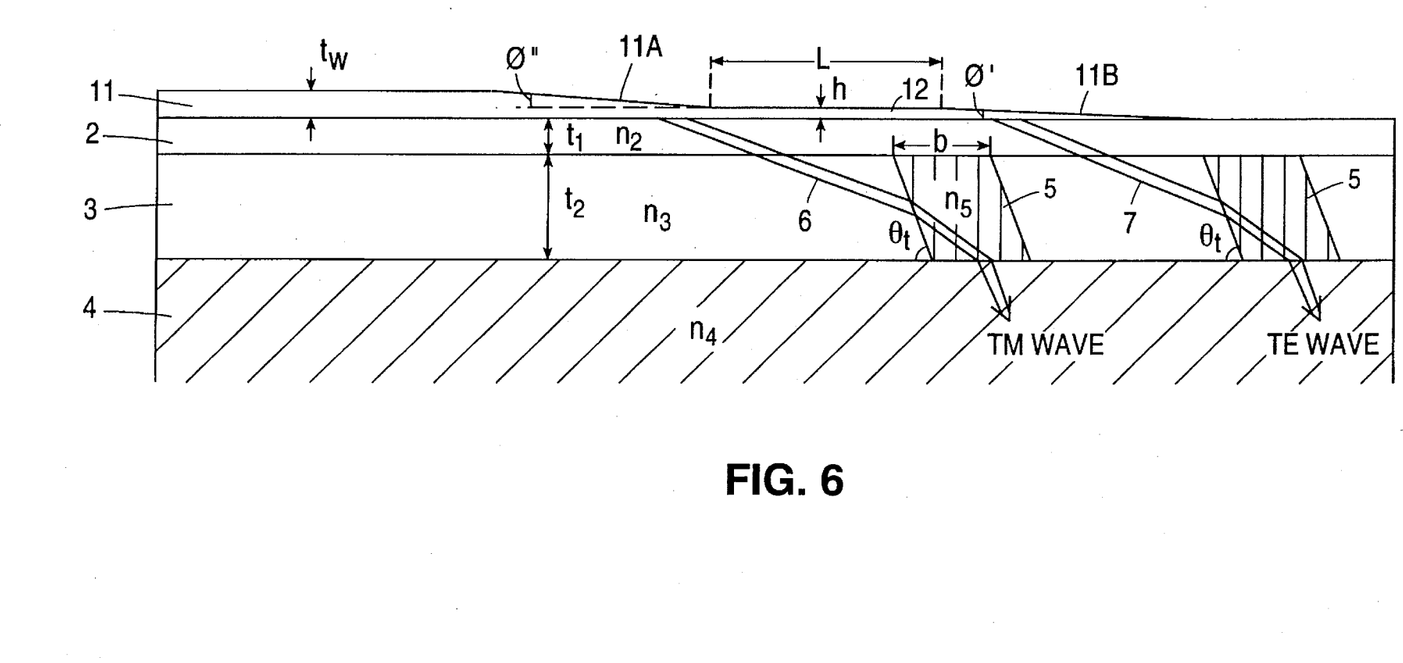
FIG. 6 is a cross-sectional view of a second example of a mode splitter according to the present invention.

FIG. 6 shows a second example of a mode splitter according to the present invention. The mode splitter includes a waveguide layer 11 having two tapered portions 11A and 11B. Other components of the device are the same as those in Example 1. A detailed explanation for each corresponding element is omitted.

The principle of the mode separation will be now explained. The first tapered portion 11A provided on the left side of the waveguide layer 11 has a thickness which gradually becomes thin from $t_w$ to h ($d_{TE}$<h<$d_{TM}$) in the right side, following the direction in which light wave is propagated in accordance with a gradient angle $\phi''$. The second tapered portion 11B is formed with a gradient angle $\phi'$. The waveguide layer 11 has a flat waveguide layer portion 12 with a length of L and a thickness of h interposed between the first tapered portion 11A and the second tapered portion 11B.

In the case where the TE wave and the TM wave are propagated through the waveguide layer 11, the thickness h is set so that the light wave of the $TM_O$ mode is cut off and only the light wave of the $TE_O$ mode can be propagated.

As a result, the TM wave is emitted from the vicinity of the cut-off position to the substrate 4 through a path 6. Accordingly, only the TE wave is propagated into the flat waveguide layer portion 12 coupled to the tapered portion 11A. Similarly, the TE wave is propagated through the tapered portion 11B and then emitted from the vicinity of the cut-off position to the substrate 4 through a path 7.

In this example, there is an advantage that by appropriately adjusting the length L, a distance between the emission position of the TE wave and that of the TM wave can be set with independence of the gradient angle $\phi''$ and the gradient angle $\phi'$. Thus, the degree of freedom in designing the device, thereby improving the formation thereof.

EXAMPLE 3

Figure 7:
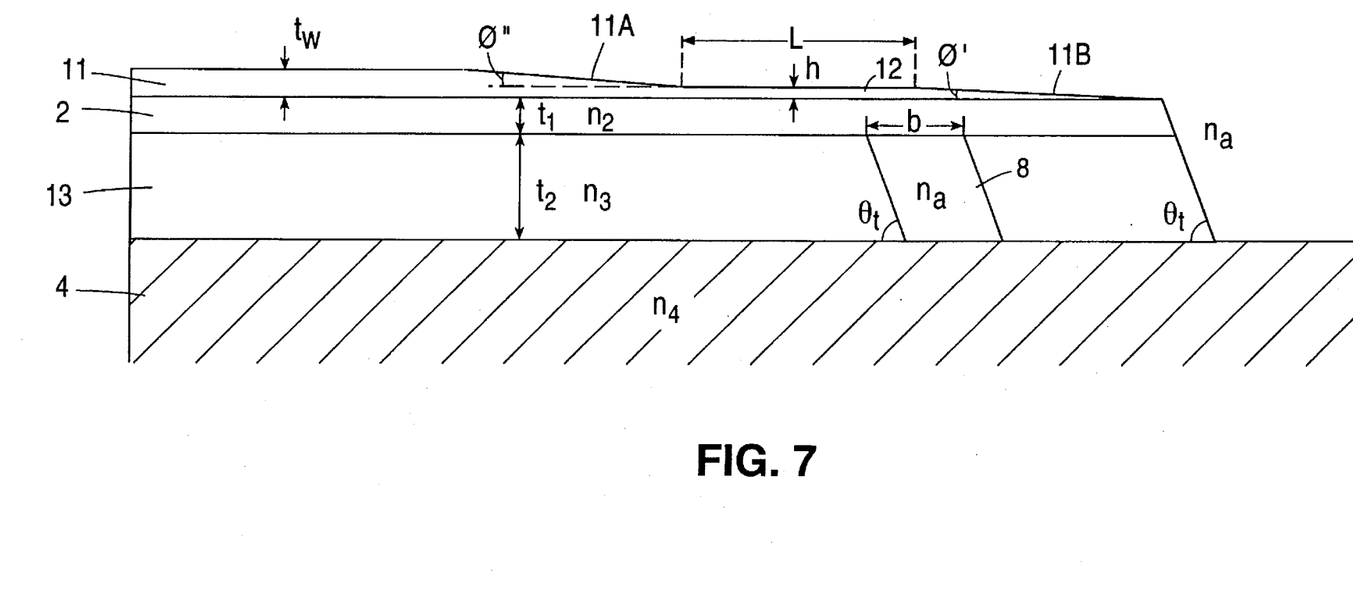
FIG. 7 is a cross-sectional view of a third example of a mode splitter according to the present invention.

FIG. 7 shows a third example of a mode splitter according to the present invention. The mode splitter has the same second intermediate layer 13 as that of the mode splitter in Example 2 except that an aperture 8 (refractive index $n_a$=1.0) for emitting the TM wave is provided therein. Due to the aperture 8, the refractive index for the light wave can be made larger, compared with the refractive index of the refractive region 5. As a result, the emission angle $\theta_O$ from the device can be made larger.

Furthermore, edges of the first intermediate layer 2 and the second intermediate layer 13 are diagonally cut off with an angle $\theta_t$ as shown in FIG. 7, thereby forming the same aperture on the right side of the edges. Thus, the same effects as the above can be obtained.

EXAMPLE 4

Figure 8:
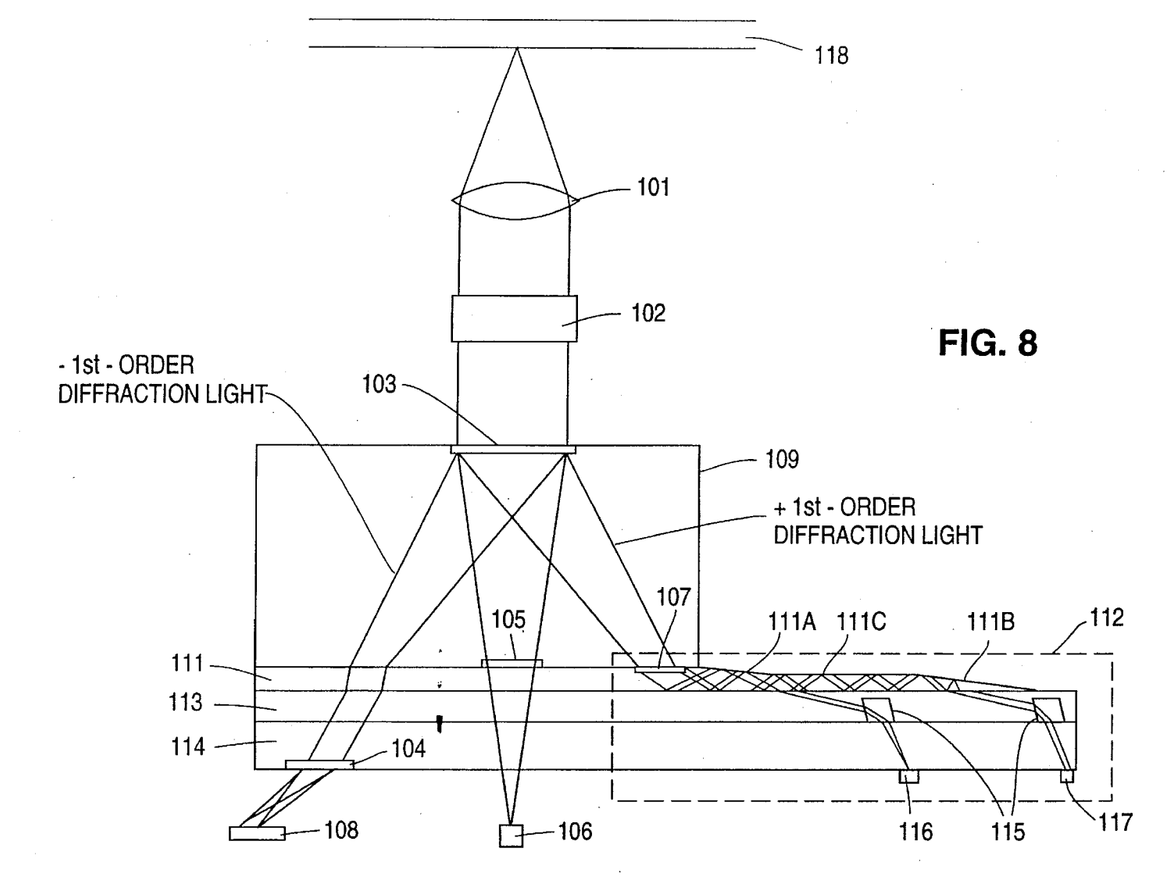
FIG. 8 is a schematic side view of a magneto-optical disk pick-up device according to the present invention.

FIG. 8 shows a fourth example of the present invention, in which the mode splitter of the present invention is applied to a magneto-optical pick-up device.

First, the structure of the magneto-optical pick-up device will be described. The magneto-optical pick-up device has a substrate 114 on which an intermediate layer 113 and a waveguide layer 111 are formed. The waveguide layer 111 includes a flat section and a tapered section. A glass substrate 109 is mounted on the flat section of the waveguide layer 111. A hologram 103 is formed on an almost middle portion of the upper surface of the glass substrate 109, and a tracking beam generation grating 105 is formed on a back surface of the glass substrate 109 below the hologram 103.

A mode splitter 112 which is provided on the right side of the glass substrate 109 includes the substrate 114, the intermediate layer 113 and the waveguide layer 111. The waveguide layer 111 in the mode splitter 112 has two tapered portions 111A and 111B interposing a flat waveguide layer 111C portion therebetween.

A semiconductor laser 106 as a light source is provided below the tracking beam generation grating 105 and outside the substrate 114. A divided hologram 104 including two holograms each having a different grating period is provided on a left of the back surface of the substrate 114. A five-divided photo diode (PD) 108 for detecting a minus 1st-order diffraction light wave from the hologram 103 so as to produce a servo signal is provided diagonally below the hologram 104.

A light coupler 107 is provided on the waveguide layer 111 at the right side of the tracking beam generation grating 105. The light coupler 107 leads a plus 1st-order diffraction light wave from the hologram 103 to the mode splitter 112. A PD 116 and a PD 117 are provided on a back surface of the substrate 114. The PD 116 detects a P wave (TM wave) of the plus 1st-order diffraction light wave from the left refractive region 115. The PD 117 detects an S wave (TE wave) of the plus 1st-order diffraction light wave from the right refractive region 115.

Further, a collimator lens 102, an objective lens 101 and a magneto-optical disk 118 are provided above the hologram 103 in this order.

The operation of the magneto-optical disk pick-up device will be now described. A light wave emitted from the semiconductor laser 106 is first divided into a main beam and a sub beam by the tracking beam generation grating 105. The main beam is incident on the objective lens 101 through the hologram 103 and the collimator lens 102, thereby being converged in an information track of the magneto-optical disk 118. The polarization plane of the light wave rotates by the Ker effect at the magneto-optical disk 118, and the light wave is reflected by the magneto-optical disk 118 so as to be led to the hologram 103 through the objective lens 101 and the collimator lens 102. The reflected light wave of the main beam is diffracted by the hologram 103, thereby generating the plus 1st-order diffraction light wave and the minus 1st-order diffraction light wave. Moreover, the sub beam is diffracted in the same way as the main beam.

Next, the plus 1st-order diffraction light wave is led to the mode splitter 112 through the light coupler 107, whereby a light wave of the $TE_O$ mode and a light wave of the $TM_O$ mode are excited in the waveguide layer 111 by the S wave and the P wave, respectively. As a result, the TM wave and the TE wave are detected by the PD 116 and the PD 117, respectively, based on the mode separation function of the mode splitter 112. In response to the intensity of each light wave, the PD 116 and the PD 117 photoelectrically produce detection signals and send them to a signal processing system (not shown). Based on the detection signals output from the PD 116 and PD 117, information recorded on the magneto-optical disk 118 (magneto-optical signals) is reproduced.

Figure 9A:
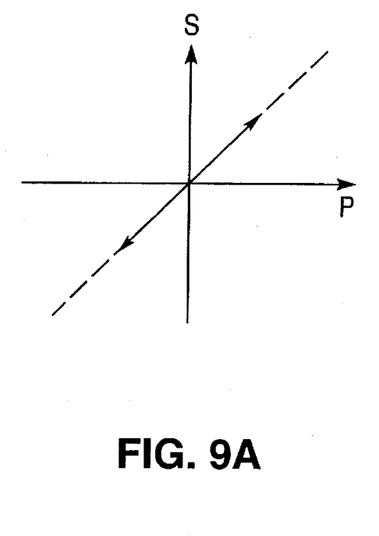
FIGS. 9A, 9B and 9C are views showing the relationship between a magnetization direction of a magneto-optical disk and a rotation of a polarization plane.
Figure 9B:
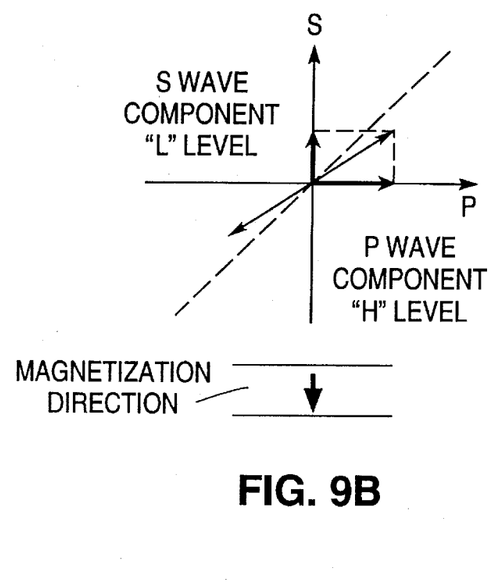
Figure 9C:
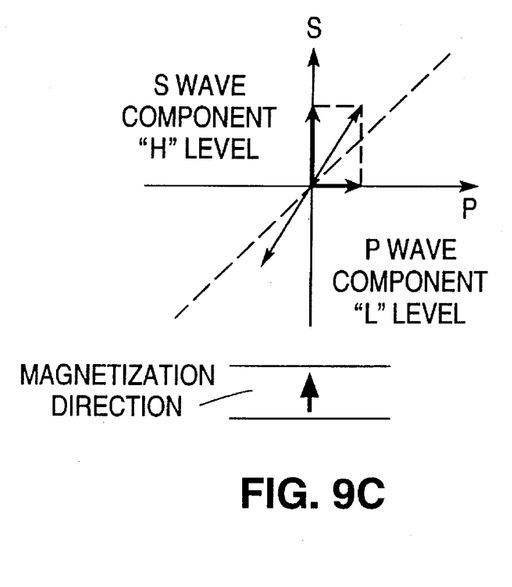

The reproduction mechanism of this will be explained in more detail with reference to FIG. 9. In the case where a polarization plane of a laser light wave is previously rotated at 45° as shown in FIG. 9A, the direction of the polarization plane is varied depending on the magnetization direction of a recording layer of the magneto-optical disk 118 as shown in FIGS. 9B and 9C for comparison. As a result, the strength of the S wave component and that of the P wave component are different between FIG. 9B and FIG. 9C. For example, in the case of FIG. 9B, the detected level of the S wave component is "L" (=LOW) level and the detected level of the P wave component is "H" (HIGH) level. On the contrary, in the case of FIG. 9C, the detected level of the S wave component is "H" level and the detected level of the P wave component is "L" level. Accordingly, the detection signals output from the PD 116 and PD 117 can reproduce the magneto-optical signals.

On the other hand, the minus 1st-order diffraction light wave generated by the hologram 103 is led to the five-divided PD 108 together with the main beam and the sub beam through the divided hologram 104, thereby producing the servo signals. The principle will be described below with reference to FIG. 10.

Figure 10:
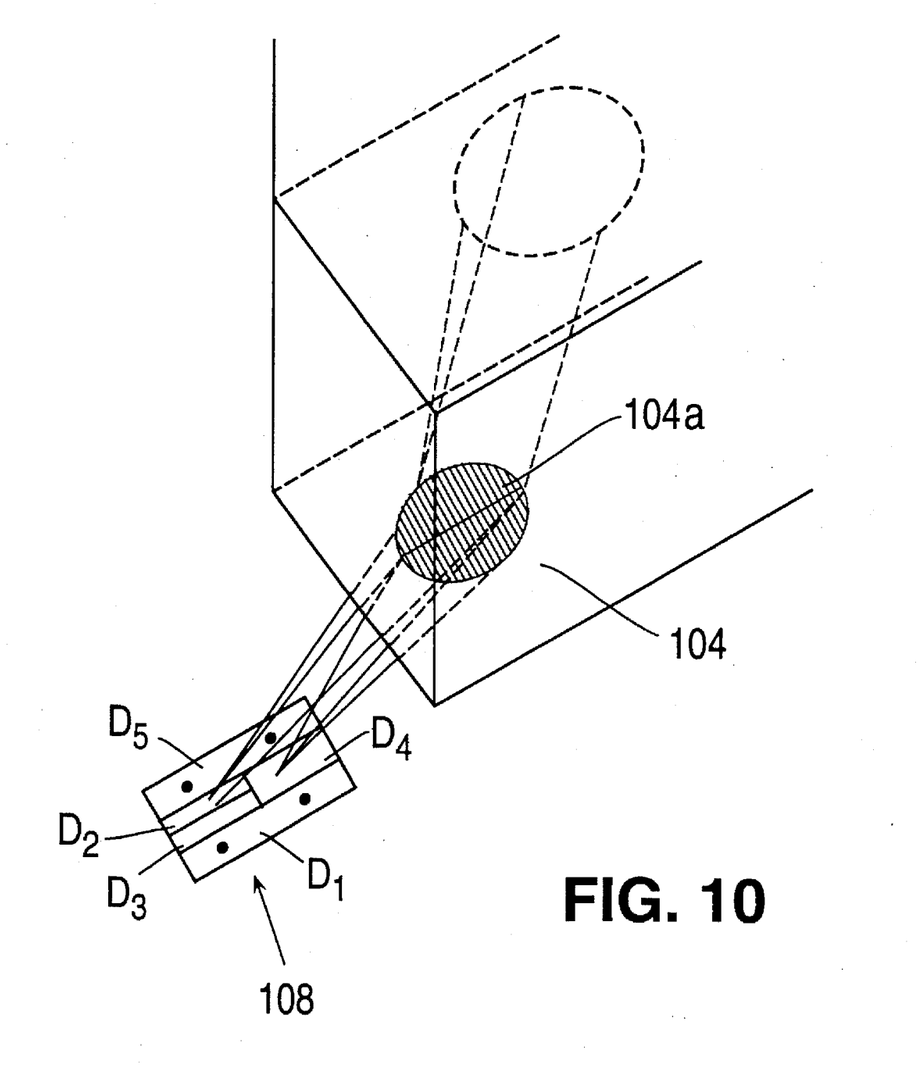
FIG. 10 is a perspective view showing an enlargement of a servo signal generation system of the magneto-optical disk pick-up device as shown in FIG. 8.

The divided hologram 104 is divided by the division line 104a into two regions each having a different grating period. The five-divided PD 108 is divided into five light detecting portions $D_1$, $D_2$, $D_3$, $D_4$ and $D_5$ with respect to the division line 104a. Accordingly, the reflected light wave of the main beam which is incident on one region of the divided hologram 104 is focused on the division line between the light detecting portions $D_2$ and $D_3$. Further, another reflected light wave of the main beam which is incident on the other region of the divided hologram 104 is focused on the light detecting portion D4. Furthermore, each reflected light wave of the sub beam is focused on the light detecting portions $D_1$ and $D_5$.

Now, an output (photoelectrically converted electrical signal) from each segment (light detecting portion) of the five-divided PD 108 is $S_1$, $S_2$, $S_3$, $S_4$, and $S_5$. A focusing error signal (FES) indicates whether light converged on the magneto-optical disk 118 by the objective lens 101 is properly focused thereon or not. The FES is represented by the following Formula (7) based on the Foucault method.

$$FES=S_2-S_3 \qquad (7)$$

Further, a radial error signal (RES) for indicating whether a tracking is correctly carried out or not is represented as the following Formula (8) based on the three-beams method.

$$RES=S_1-S_5 \qquad (8)$$

A detailed explanation of a generation method of the servo signal is disclosed in, for example, Japanese Laid-Open Patent Publication No. 1-151022.

In this magneto-optical disk pick-up device, the servo signal generation system including the divided hologram 104, the five-divided PD 108 and the like are combined with a magneto-optical signal generation system including the light coupler 107, the PD 116, the PD 117 and the like. Accordingly, the magneto-optical disk pick-up device of this example can be more miniaturized compared to a conventional magneto-optical disk pick-up device.

EXAMPLE 5

Figure 11:
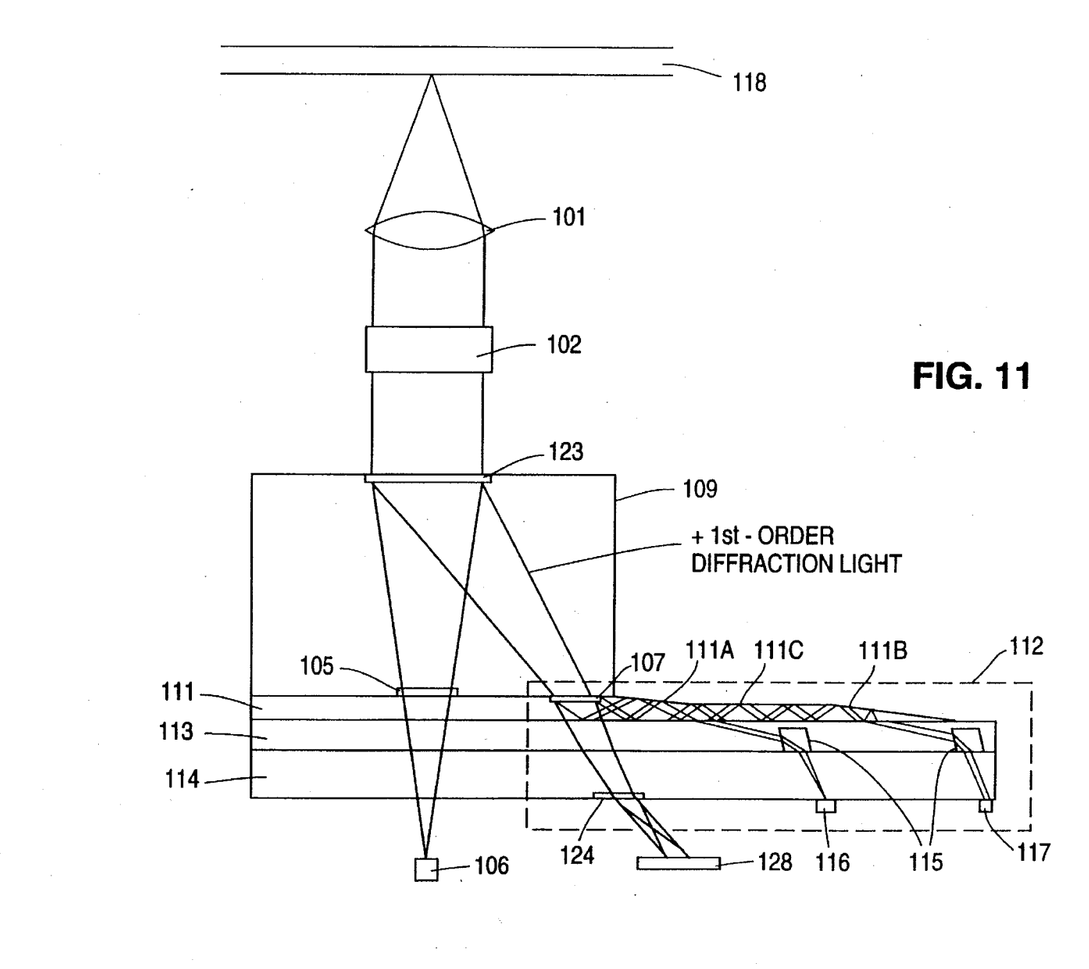
FIG. 11 is a schematic side view of another magneto-optical disk pick-up device according to the present invention.

FIG. 11 shows a fifth example of the present invention, in which the mode splitter is applied to the magneto-optical disk pick-up device in another manner.

In this example, a hologram 123 corresponding to the hologram 103 in Example 4 is made to be blazed (i.e., a grating shape thereof is changed into a sawtooth shape), thereby suppressing generation of a minus 1st-order diffraction light wave. Thus, a plus 1st-order diffraction light wave can be more effectively led to the light coupler 107 compared with Example 4.

Part of the 1st-order diffraction light wave is not coupled with the optical waveguide of the mode splitter 112, but passes through the light coupler 107. This part of the 1st-order diffraction light wave is led to the five-divided PD 128 through a divided hologram 124, thereby producing the servo signal. The magneto-optical disk pick-up device of this example has a divided hologram provided on a back face of the substrate 114 diagonally below the light coupler 107 and a five-divided PD 128 provided outside the substrate 114 diagonally below the divided hologram 124.

According to the magneto-optical disk pick-up device of Example 5, there are advantages of reducing the size of a magneto-optical disk pick-up device as in Example 4 and realizing a magneto-optical disk pick-up device in which utilization efficiency of the light wave can be further improved.

As described above, the mode splitter according to the present invention includes a tapered waveguide portion whose thickness gradually becomes thin so that a light wave of at least one mode can be cut off. As a result, an emission position of a light wave can be varied depending on its mode. Accordingly, in this mode splitter, the emission position of the light wave of each mode can be set by changing the thickness of the tapered waveguide, thereby improving the degree of freedom of the structure of the device.

Moreover, a light wave of a desired mode can be obtained by using a radiation from the tapered waveguide portion, so that a coupler for emitting the light wave is not required. Accordingly, a bad influence caused by a wavelength shift can be removed and the mode splitter can be made compact.

In the case of using the mode splitter as a polarization separation device, it is not required for a light wave to be diagonally incident on the tapered waveguide portion. As a result, the deterioration of the extinction ratio is avoided.

In another aspect of the invention, a plurality of refractive regions each having a different refractive index are provided in a second intermediate layer on the side where a light wave is emitted from a waveguide layer. As a result, the degree of freedom in an emission direction of light wave can be improved, whereby the emission of light wave can be facilitated. Accordingly, the mode splitter can be expected to be applied to various optical integrated devices such as a magneto-optical disk pick-up device.

In a mode splitter which includes a plurality of tapered waveguide portions, the emission position of a light wave of each mode can be regulated independently of a gradient of the tapered waveguide portion. As a result, the degree of freedom in the structure of the device can be further improved.

An magneto-optical disk pick-up device according to the invention includes the mode splitter of the invention so that the servo signal generation system can easily be combined with the magnetic signal generation system, thereby reducing the size of the device and reducing cost.

Various other modification will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A mode splitter, comprising:

a sub strate;

an intermediate layer formed on said substrate;

a waveguide layer formed on the intermediate layer;

said waveguide layer includes:

a first uniform waveguide section having a first thickness, a second uniform waveguide section having a second thickness;

a first tapered waveguide section interposed between the first and second uniform waveguide sections and coupled therewith, a thickness of the first tapered waveguide section gradually becoming thinner from the first thickness to the second thickness;

and a second tapered waveguides section coupled with the second uniform waveguide section, the first and second tapered waveguide sections sandwiching the second uniform waveguide section, and a thickness of the second tapered waveguide section gradually becoming thinner from the second thickness;

wherein the uniform waveguide sections propagates a plurality of light waves of different modes; and each of the light waves of different modes is respectively cut off at different positions in the tapered waveguide sections such that each of the light waves from the respective different positions of the tapered waveguide sections are emitted into the intermediate layer respectively at certain determined emission angles.

2. A mode splitter according to claim 1, wherein the intermediate layer comprises:

a first layer formed beneath the waveguide layer, a second layer formed beneath the first layer, the second layer including at least one refracting region formed therein for refracting a corresponding one of the light waves emitted from the tapered waveguide section.

3. A mode splitter according to claim 2, wherein the refracting region is made of a material which is different from that of the second layer and has a lower refractive index than that of the second layer.

4. A mode splitter according claim 3, wherein the substrate supports the first and second layers and the waveguide layer, and has a refractive index being higher than that of the refracting region.

5. A mode splitter according to claim 4, wherein the refracting region has a shape in which one side thereof is inclined with respect to the second layer at an angle of $\theta_t$, the angle of $\theta_t$ being set so as to satisfy the following equations:

$$\theta_O = \arcsin\{n_5 \cdot \cos(\theta_t - \theta_y)/n_4\}$$

$$\theta_y = \arcsin\{n_3 \cdot \cos(\theta_t - \theta_r)/n_5\}$$

where $n_3$ is the refractive index of the second layer, $n_4$ is the refractive index of the substrate, $n_5$ is the refractive index of the refracting region, $\theta_y$ is a refractive angle of the refracting region, $\theta_o$ is an emission angle from the refracting region and $\theta_r$ is an emission angle from the tapered waveguide section of the waveguide layer.

6. A mode splitter according to claim 4, further comprising a plurality of photo detectors for detecting the light waves emitted from the intermediate layer, the photo detectors being provided in such a manner that the photo detectors oppose to the intermediate layer with the substrate interposed therebetween, wherein the intermediate layer leads the light waves emitted from the tapered waveguide sections toward the photo detectors.

7. A mode splitter according to claim 1, wherein the waveguide layer includes a plurality of the tapered waveguide sections.

8. A mode splitter according to claim 1, wherein the plurality of light waves of different modes includes a TM mode wave and a TE mode wave.

9. A mode splitter according to claim 1, wherein a gradient angle of the first tapered waveguide section is different from that of the second tapered waveguide section.

* * * * *